Jan. 27, 1970  R. SECCOMBE ET AL  3,491,837
WHEEL BEARING NUT TORQUING AND ADJUSTING TOOL
Filed April 17, 1968  2 Sheets-Sheet 1

INVENTORS
ROBERT SECCOMBE
JOHN STEADLE
FRED J. RITZ

*Bernard J. Murphy*
AGENT

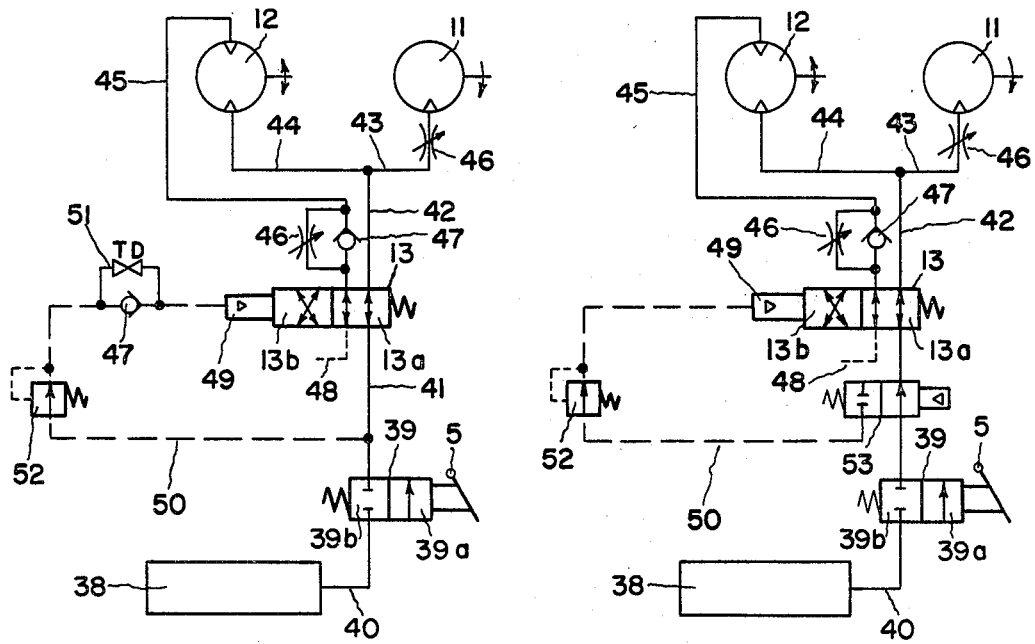
FIG. 6
FIG. 7
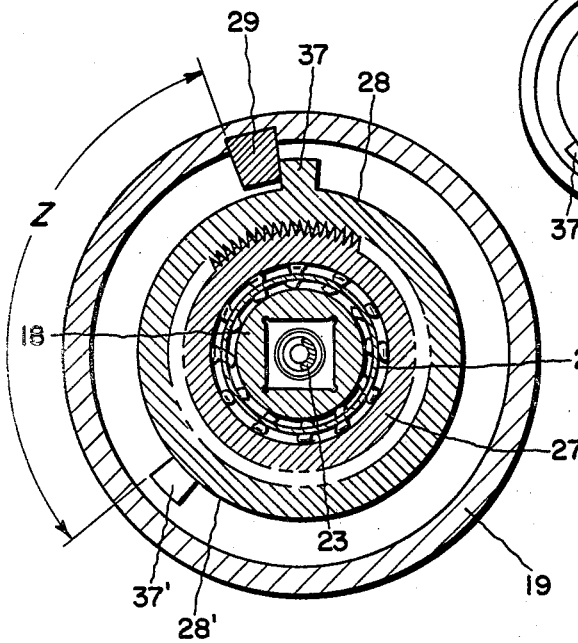
FIG. 3
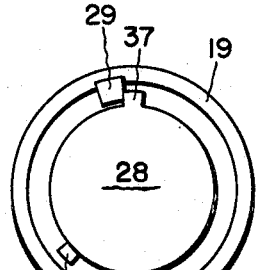
FIG. 4
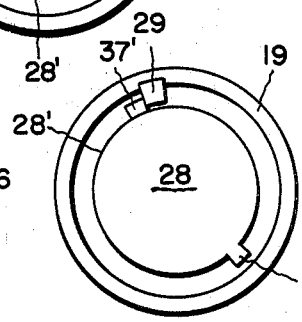
FIG. 5
INVENTORS
ROBERT SECCOMBE
JOHN STEADLE
FRED J. RITZ
AGENT United States Patent Office 3,491,837
Patented Jan. 27, 1970

3,491,837
WHEEL BEARING NUT TORQUING AND ADJUSTING TOOL
Robert Seccombe, Dearborn Heights, and John Steadle and Fred J. Ritz, Livonia, Mich., assignors to Ingersoll-Rand Company, New York, N.Y., a corporation of New Jersey
Filed Apr. 17, 1968, Ser. No. 730,670
Int. Cl. B25b 23/14; F01c 21/12; B23q 5/20
U.S. Cl. 173—12                    16 Claims

ABSTRACT OF THE DISCLOSURE

A portable, fluid-operated tool for torquing and adjusting wheel bearing nuts, having a reversible motor for torquing the nut in one direction and backing-off the nut, to set end-play for the bearing, in the other direction. Fluid valving and controls are operative automatically to drive the motor alternately, in each of the directions.

---

This invention pertains to tools used for automatically torquing nuts or bolts, and in particular to a portable power tool for automatically torquing, and adjusting the torque of a wheel bearing nut received on a wheel spindle.

Automatically operative, portable power tools are well known in the prior art and are used extensively to drive a nut to the proper torque on a spindle, or other threaded receiving member. Such are used, for instance, to torque wheel bearing nuts on wheel spindles. While using one of such known tools, the operator manually rotates the wheel drum to prevent the wheel bearing from damaging (brinelling, as it is sometimes called) the bearing races. Once the nut is driven to torque, the operator, or a next operator, uses a hand wrench, or the like, to back-off the nut a quarter turn, or half turn, or whatever, to provide for any necessary end-play. Possibly, in assembly-line operations, the first operator will develop sufficient competence to use his power tool to set the end-play in a coarse adjustment. In this, the operator would simply reverse the power tool drive after having torqued the nut. The coarse setting of the end-play, then, would be governed by the length of time the operator operates the power tool in the reverse mode. Under this option, when the coarse setting is made, the same or another operator measures the end play and performs retorquing or provides more end-play, making any necessary adjustments, thereby.

In either of the two procedures, it is required positively to set a final, fine adjustment of the end-play. What is desirable for this art, then, is one tool for both automatically torquing and backing-off the nut to establish the final, prescribed end-play.

It is an object of this invention, therefore, to provide a potable wheel-bearing nut torquing and adjusting tool for automatically torquing and backing-off the nut to establish the prescribed end-play, thus eliminating need for subsequent adjustment by the first or any other operator. Another object of this invention is to provide a tool of the type noted which has means for rotating the wheel drum in one direction while torquing the nut in the opposite direction. Another object of this invention is to provide a tool of the type which has means automatically responsive, after full torquing of the nut, to reverse the motion of the drive means thereof to set the prescribed end-play of the nut.

A feature of this invention comprises the use of the disc-carried stop lugs cooperative with a uni-directional clutch to accommodate a free rotation of a motor-driven torquing shaft in one direction, and a limited rotation of the shaft in the opposite direction. Another feature of this invention comprises the use of fluid valving and controls operative automatically to drive the torquing motor, alternately in each of the directions, and comprising an additional motor for turning the wheel drum in a direction opposite to that in which the torquing shaft turns when torquing the nut. Further objects and features of this invention will become more apparent by reference to the following description taken in conjunction with the accompanying figures in which:

FIG. 3 is a front sectional view of a portion of the invention showing the stop plugs, stop key, and stop housing arrangement;

FIG. 4 is a sketch representing the stop lugs, stop key, and stop housing arrangement in the normal torquing-drive position;

FIG. 5 is an additional sketch of the stop lugs, stop key, and stop housing arrangement in the halted disposition after backing-off the nut;

FIG. 6 is a schematic view of the fluid valving and controls of the invention according to a first embodiment thereof; and FIG. 7 is a schematic view of an alternate embodiment of the fluid valving and controls.

Figure 1:
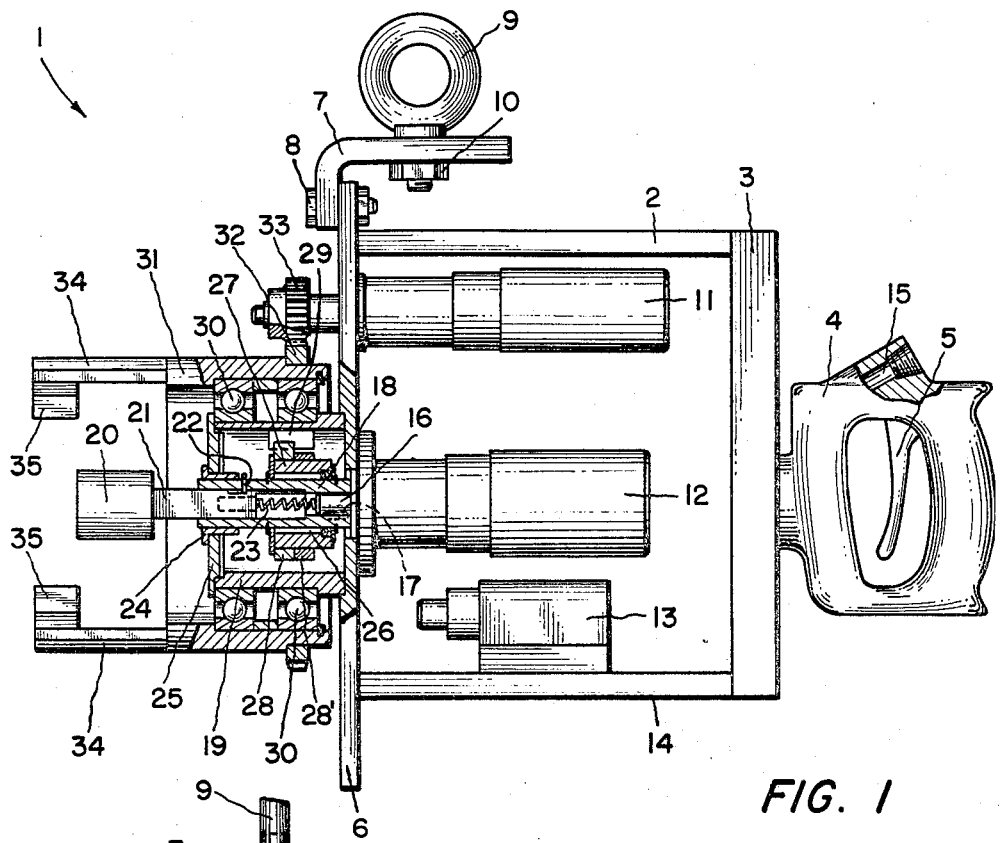
FIG. 1 is a vertical side view of an embodiment of the invention shown partly in cross-section.

Referring now to FIG. 1, a portable wheel bearing nut torquing and adjusting tool 1, according to the invention is shown in partial cross-section as comprising a frame 2 of quadrangular form. The frame 2 carries a shield plate 3 toward the rear thereof which plate mounts an operator's grip 4. The operator's grip 4 carries centrally thereof an on-off fluid switch 5. The frame 2 carries a mounting plate 6, opposite the shield plate 3, which receives an angle bracket 7 at the top secured thereto by fastening means 8. The angle bracket 7 receives an eye bolt 9, and a nut 10, for attachment thereto of a hoist cable or rope to aid in the suspension of the tool while in use.

Mounting plate 6 has mounted thereto a wheel drum motor 11 and a bearing nut motor 12. A four-way, two-position, fluid valve 13 is carried on the lower one of two cross members 14 disposed between, and joining, shield plate 3 and mounting plate 6. A pressured-fluid inlet port 15 communicates with valve 13, via switch 5, by means of pressured-fluid lines (not shown). Port 15, together with switch 5, and valve 13, comprise significant components of the fluid valving and controls to be discussed subsequently at length.

Motor 12, in association with an assembly of components coupled thereto, imparts driving torque to the bearing nut, and also power-sets the prescribed end-play by backing off the bearing nut. Motor 11, however, in association with another assembly of components coupled thereto, imparts rotation to the wheel spindle in a direction which is the reverse of that in which motor 12 torques the nut. The respective component assemblies which facilitate these operations are discussed in the following paragraphs.

A driving shaft 16 projects from bearing nut motor 12 and carries a key 17 used to secure a sleeve 18 thereabout for coincident rotation with the shaft. Sleeve 18 has a circular bore therein, running a limited portion of its length to one end, for receiving shaft 16, and a keyway formed in a wall of the bore to accept the key 17. A small cage 19 is fixed to the mounting plate 6, on the side thereof opposite motors 11 and 12, to support further components of the torquing and adjusting tool. A nut socket 20 has a square-cross-sectional shaft 21 extending therefrom. Shaft 21 is received by sleeve 18. Sleeve 18 has an additional bore, a square bore therein, running a portion of its length to the opposite end (i.e., opposite said one end which terminates the circular bore) for receiving shaft 21. In addition, shaft 21 has a short, elongated, narrow trough or slot formed, axially, in the outer surface thereof. A keeper pin 22 is fixed in and extends through a hole provided therefor in sleeve 18 to engage the slot. Accordingly, shaft 21 is arranged in sleeve 18, for sliding movement relative thereto within said square bore, for a distance limited by the length of the slot. Finally, shaft 21 has an axial bore, centrally formed therein for a limited distance in the end thereof which is opposite nut socket 20, for nesting therein one end of a compression spring 23. The opposite end of spring 23 bears against the end of driving shaft 16. Spring 23 urges shaft 21 away from driving shaft 16. A flanged, circular bushing 24 is disposed about sleeve 18 and seated in an aperture provided therefor in a forward cover 25 of cage 19. Bushing 24 supports sleeve 18 for rotation relative cage 19 and cover 25. Rotation of shaft 16 through key 17 inparts rotation to the sleeve 18, and the sleeve, in turn, imparts rotational torque to shaft 21 and the nut socket 20.

The foregoing discussion reviewed the elements which provide the means for initial torquing of the nut. In the following text those components which cooperate to automatically back-off the nut to establish the prescribed end-play are discussed.

Sleeve 18 carries thereabout a unidirectional clutch 26. Clutch 26 mounts thereon an annular stop housing 27. Finally, a pair of annular discs 28 and 28' are disposed, side-by-side, about the stop housing 27. The discs 28 and 28' each have a lug extending therefrom for engagement with a stop key 29 carried by, and projecting inwardly from, cage 19. Stop key 29 extends along the axis of rotation of shafts 21 and 16, and is firmly fixed to the inner surface of cage 19. Discs 28 and 28', and their interaction with stop key 29, are discussed further, in following paragraphs, with reference to FIGS. 3, 4, and 5. In that ensuing discussion, the manner in which these just-described components cooperate to provide for torquing and back-off of the wheel bearing nut is fully detailed.

Components carried about cage 19 cooperate to provide for a rotation of the wheel spindle concurrent with the initial torquing of the bearing nut. A pair of bearings 30 are arranged, in side-by-side relationship, about the cage 19. A large annular ring 31 is disposed about the bearings 30, the same being carried on the bearings' outer races. A ring-type spur gear 32 is fixed to the outer periphery of ring 31, and is disposed for engagement with a pinion 33 carried on the driving end of wheel drum motor 11. Fixed to the forward rim of ring 31 are a plurality of stud-engaging arms 34. Arms 34 extend perpendicularly from ring 31, and terminate in pads 35 disposed for engagement with the wheel drum studs.

Figure 2:
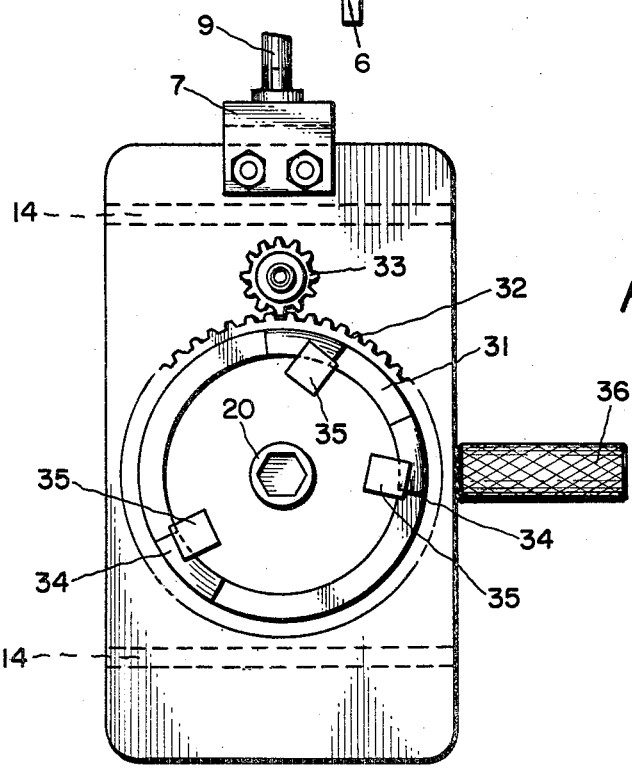
FIG. 2 is a frontal view of the embodiment of the invention of FIG. 1.

As shown in FIGS. 1 and 2, three arms 34 are fixed to ring 31. This embodiment is for use with wheels having five studs. Thus, one arm 34 is spaced from the other two by 144 degrees of arc along the rim of ring 31 at either side of said one arm; the other two arms 34 are spaced from each other by 72 degrees of arc. In an alternate embodiment, for use with wheels having four studs, a ring 31 having four equally-spaced arms 34 is used.

As pinion 33 is rotated by wheel drum motor 11, the rotation is imparted to ring 31, via gear 32, causing arms 34 to revolve. Pads 35 carried therewith bear against the wheel studs and cause the wheel spindle to rotate.

Other, equally facile means of rotating the wheel spindle, which dispense with arms 34 and pads 35, means wholly within the spirit of our invention will occur to those skilled in this art. For instance, it might be desirable to employ but an extended version of ring 31, for bearing against the wheel spindle, the extended ring effecting rotation of the spindle by frictional engagement therewith.

FIGURE 2, a front view of the novel tool, shows an operator's handle 26 extending from one side of the mounting plate 6. Handle 36 is fixed to a bracket (not shown) welded to plate 6. Handle 36 and the operator's grip 4 together, in cooperation with a suspending cable or the like through the eye bolt 9, facilitate manipulation and handling of the tool.

FIGURE 3 shows in a front sectional view the pair of annular discs 28 and 28' disposed about the stop housing 27, disc 28 having a lug 37 projecting radially therefrom which is in abutting engagement with the stop key 29. It is to be noted that the external surface of stop housing 27 is formed with axial splines about the periphery thereof. Discs 28 and 28' have corresponding splines formed internally thereof, these being provided for mating with the splines on the stop housing. Accordingly, the discs 28 and 28' individually, or together, can be withdrawn from the stop housing 27, rotated, and replaced on the stop housing to change the angular relationship of the discs with respect to each other, and with respect to the stop key 29. This provisioning is for a purpose described in the following text having to do with setting the limits of the back-off of the nut. As FIG. 3 shows, the foremost disc 28 has a stop lug 37 extending therefrom abutting against stop key 29. A stop lug 37', extending from the rearwardly disposed corresponding disc 28', is shown at an angular disposition from the first stop lug 37. The second stop lug 37' is spaced at some selected degree of arc Z from the stop key 29. With this arrangement, lugs 37 and 37', in cooperation with the unidirectional clutch 26, define the limit of rotation in the reverse direction for sleeve 18. This functioning is best understood by reference to FIGS. 4 and 5.

In FIG. 4, the discs 28 and 28' and lugs 37 and 37' are shown in their normal disposition when motor 12 is driving the nut to torque. With rotation of the motor 12 in the torque-driving direction, clutch 26 is inoperative. Therefore, clutch 26 does not impart the rotation of sleeve 18 to stop housing 27. Internal friction and centrifugal forces, however, will carry the stop housing 27 and discs 28 and 28' in the torquing direction of rotation until lug 37 bears against stop key 29. Thereafter, sleeve 18 continues to rotate within the restrained stop housing 27.

With rotation of the motor 12 in the "un-torquing" or end-play setting direction, clutch 26 is operative. Clutch 26 positively engages stop housing 27 and communicates thereto the positive drive of sleeve 18. Discs 28 and 28' turn with the stop housing 27 until stop lug 37' is carried into abutting relationship with stop key 29.

In FIG. 5, the discs 28 and 28' and lugs 37 and 37' are shown after having been rotated in the "un-torquing" or end-play setting direction through Z degrees of arc, and lug 37' is stopped against stop key 29. At this point, sleeve 18 is braked against further rotation. The "un-torquing" is stopped, and motor 12 is stalled.

Our novel tool incorporates fluid valving and controls for appropriately enabling the motors 11 and 12. Clearly, our wheel bearing nut tool must have means operative for automatically enabling motor 12 for operation in the torquing direction for a period of time during which sufficient opportunity is provided to fully torque the nut. Additionally, means need to be provided for automatically reversing motor 12 so as to "un-torque" the nut. The latter means must become operative, automatically, after the former means have satisfied its function. Both such means are schematically illustrated in FIG. 6.

FIGURE 6 shows a first embodiment of fluid valving and controls incorporated with, and for operation of, the torquing and adjusting tool. The index number 38 denotes a source of pressured and filtered fluid for use by the fluid valving and controls. A two-position, biased valve 39 is used to interrupt the source of fluid from the fluid control components. The on-off fluid switch 5 is used to overcome the bias of valve 39 to allow communication of the fluid through valve 39. A supply line 40 communicates the source 38 with valve 39. Section 39a of valve 39 communicates fluid therethrough in one direction. Section 39b of valve 39 interrupts fluid flow. A primary pressure line 41 communicates valve 39 with the four-way, two-position fluid valve 13. Valve 13 has a section 13a which communicates fluid therethrough in two directions, i.e., "supply" and "return," and has a section 13b which communicates fluid therethrough in directions reverse of said two directions, i.e., conversely, "return" and "supply." A primary inlet line 42 communicates valve 13 with wheel drum motor line 43 and wheel bearing nut motor line 44.

Line 43 communicates between line 42 and motor 11 providing fluid pressure for enabling motor 11. Motor 11 is unidirectional and, as noted earlier, turns the wheel drum in one direction while the wheel bearing nut is being torqued in the opposite direction. Line 44 communicates fluid pressure between line 42 and motor 12. Motor 12 is bi-directional, i.e., it operates in both directions of rotation to torque the wheel bearing nut in one direction and to back off the nut to set the end-play of the bearing in the opposite direction. Line 44 provides the fluid pressure for enabling motor 12 in the torquing direction.

A secondary inlet line 45 is communicated between motor 12 and valve 13. Line 45 provides the fluid pressure for enabling motor 12 in the back-off or end-play setting direction. Line 45 also has disposed therein, in parallel, a speed control valve 46 and a check valve 47. speed control valve 46 has means for adjusting the setting thereof whereby the speed of motor 12 can be controlled. It is also to be noted that wheel drum motor line 43 has an identical speed control valve 46 for controlling the rotation speed of motor 11. Check valve 47 is provided to inhibit the flow of fluid from motor 12 to valve 13. However, a vent line 48 extends from section 13a of valve 13 whereby, in a normal "torquing" setting of valve 13, as shown in FIG. 6, secondary inlet line 45 is vented.

Valve 13 is normally resiliently constrained in the position shown in FIGURE 6, to impart fluid flow to motors 11 and 12, and has an actuator 49 which is fluid-responsive to overcome this normal torquing-facilitating setting thereof. A secondary pressure line 50 communicates between valve 39 and actuator 49 by means of which a control fluid pressure is communicated therethrough to operate valve 13. However, it is not desired to have valve 13 switch, to communicate fluid through section 13b thereof, until motor 12 has been enabled for rotation in the "torquing" direction for a sufficient period of time in which to properly torque the nut. Accordingly, a timing valve 51 is disposed in line 50. Timing valve 51 becomes operative to communicate an actuator control fluid pressure therethrough, only when the prescribed period of time for which it is set has elapsed. A pressure regulator device 52 is disposed in line 50 between timing valve 51 and valve 39 to limit the amount of fluid volume admitted to the timing valve 51.

In operation, the operator puts the nut socket 20 in engagement with the wheel bearing nut, with pads 35 bearing against the wheel drum studs. Then, the operator manually actuates the on-off fluid switch 5 which switch in turn places section 39a of valve 39 in position to communicate line 40 with lines 41 and 50. This energizes the motors 11 and 12. The former of the two, motor 11, rotates the wheel drum while the latter, motor 12, drives the wheel bearing nut to torque.

The setting of timing valve 51 provides a given period of time during which motor 12 will turn the nut to torque. When this timing valve-provisioned time has elapsed, timing valve 51 will impart fluid pressure to actuator 94 which, in turn, will change the setting of valve 13 by placing section 13b in communication between lines 41 and 42. Accordingly, motor 11 will halt, and motor 12 will halt and reverse. On reversal, the unidirectional clutch 26 will engage and carry the discs 28 and 28' and the stop housing 27, in positive driving rotation in unison with the motor shaft 16 and sleeve 18, in the reversed direction. The discs 28 and 28' will rotate, as suggested by FIGS. 4 and 5, until the stop lug 37' of the rearwardly-disposed disc 28' bears against stop key 29. This limits the reverse rotation of sleeve 18; accordingly, this limits the untorquing, the end-play setting for the wheel bearing nut, and stalls motor 12.

An alternate embodiment of the fluid valving and controls shown in FIG. 7 comprises the same fluid source 38 and valve 39 in cooperation with valve 13. However, in this arrangement, a timing valve is not employed. Rather a pressure-responsive, pressure-sensing valve 53 is disposed between valve 39 and actuator 49. Valve 53 "reads" the pressure build up of fluid through line 41, as motor 12 is driving the nut to torque. When motor 12 stalls, the nut being fully torqued, the pressure in line 41, will rise markedly. Valve 53 sensing this pressure rise imparts fluid pressure to actuator 49 causing an operative displacement of valve 13. This displacement causes motor 12 to reverse its motion to establish the end-play of the wheel bearing nut.

After a wheel bearing nut has been torqued, and the untorquing, end-play has been set, stop lugs 37 and 37' will be disposed as shown in FIG. 5. The operator will release switch 5, withdraw the tool, and proceed to a next nut for torquing and setting thereof. With the succeeding operation, during torquing, the unidirectional clutch 26, of course, is not engaged. However, as noted earlier, internal friction and centrifugal forces will carry the stop housing 27 and the discs 28 and 28' in the primary or torquing direction until stop lug 37 bears against stop key 29, as shown in FIGS. 3 and 4. This sets up the tool for the subsequent end-play setting encompassed by the Z angle (FIG. 3). Clearly, the degree of the Z angle can be altered by removing discs 28 and 28' from the stop housing 27, and replacing them again with an altered angular displacement between stop lugs 37 and 37'. This will change the amount of end-play provisioned for the wheel bearing.

Hardware not shown secures socket 20 to shaft 21, and secures cover 25 to cage 19. To alter the angular displacement between lugs 37 and 37', one removes the hardware securing socket 20 and cover 25 and withdraws said socket and cover. Bushing 24 will remove from the cage 19 with cover 25. A snap ring clasped about sleeve 18 holds an annular thrust ring against stop housing 27 and discs 28 and 28'. By removing said snap ring and thrust ring, access to the discs is gained. Each disc can then be slid off the splines of housing 27 and repositioned on the housing in some altered displacement providing, therefor, more or less resultant end-play.

We claim:
1. A wheel bearing nut torquing and adjusting tool, comprising:
    a frame;
    power means, carried by said frame, operable for turning the nut in first and reverse directions;
    single valving means, having power communicating and interrupting positions, throughconnected with said power means for controlling the conduct of power thereto for enabling and halting said power means; and
    control means interposed between said valving means and said power means for effecting an operation of the latter in a given mode, to turn the nut in said first direction to effect a full torquing of the nut, in response to disposal of said valving means in said communicating position; said control means comprising means automatically responsive only to both said full torquing and retention of said valving means in said communicating position, for effecting automatic and sequential operation of said power means in a different mode to turn the nut in said reverse direction to cause a backing-off of the nut from the full torquing thereof.

2. A tool, according to claim 1, wherein said control means cause said power means to turn the nut but an alterable, predetermined distance in said reverse direction.

3. A tool, according to claim 1, further comprising: means coupled to said frame providing for portability of said tool.

4. A tool, according to claim 1, wherein:
said power means comprise a fluid motor having a plurality of pressured-fluid inlet ports; and
said control means comprise means for throttling pressured-fluid supplied to said motor, valving means interposed between said throttling means and said inlet ports to control flow of pressured-fluid to said motor, and means coupled to said valving means, automatically responsive to the lapse of a given period of time, to cause said valving means to switch pressured-fluid flow from one of said inlet ports to another of said inlet ports to cause said motor to reverse.

5. A tool, according to claim 1, further comprising: means carried by said frame for automatically rotating the wheel in said reverse direction.

6. A tool, according to claim 5, wherein:
said control means cooperate with said wheel-rotating means to cause the latter to rotate said wheel while said power means turn said nut in said first direction.

7. A tool, according to claim 1, wherein:
said power means comprise a shaft,
means carried by one end of said shaft for engaging the nut,
motor means coupled to the other end of said shaft for turning thereof, and
means coupled to said shaft for positively limiting the turning of the nut to an alterable, predetermined distance in said reverse direction.

8. A tool, according to claim 7, wherein:
said control means further comprise timing means operative, in response to a lapse of a given period of time during which said nut is turned in said first direction, to enable the turning of said nut in said reverse direction.

9. A tool, according to claim 8, wherein:
said control means further comprise actuator means coupled to, and responsive to operation of, said timing means for causing said motor means to turn said shaft in said reverse direction.

10. A tool, according to claim 7, wherein:
said motor means comprise a fluid motor; and
said control means further comprise fluid pressure sensing means coupled to said fluid motor operative in response to a change in pressure of fluid communicating with said motor to halt said motor.

11. A tool, according to claim 10, wherein:
said control means further comprise actuator means coupled to, and responsive to operation of, said pressure sensing means for causing said motor to turn said nut in said reverse direction.

12. A tool, according to claim 7, wherein:
said limiting means comprise stop means carried by said shaft for positive rotation therewith; and
further include means carried by said frame for the engagement of said stop means therewith.

13. A tool, according to claim 12, wherein:
said stop means comprise a plurality of juxtaposed discs;
the discs of said plurality each having a lug extending therefrom;
the lug of one disc being disposed to bear against one surface of said engagement means; and
the lug of another disc being disposed to bear against another surface of said engagement means.

14. A tool, according to claim 12, wherein:
said limiting means further comprise means interfacing said shaft and said stop means for prohibiting positive rotation of said stop means when said shaft turns in said first direction.

15. A tool, according to claim 14, wherein:
said limiting means further comprise a stop housing carried by said shaft;
said stop means are carried by said housing; and
said stop means are adjustably engaged with said stop housing for coicident positive rotation therewith.

16. A tool, according to claim 15, wherein:
said prohibiting means, shaft, stop housing, and stop means execute coincident positive rotation in said reverse direction, and said shaft and a portion of said prohibiting means execute coincident positive rotation in said first direction.

References Cited
UNITED STATES PATENTS

| | | | |
|---|---|---|---|
| 2,725,918 | 12/1955 | Deshler | 173—12 X |
| 2,900,856 | 8/1959 | Maier | 81—32.4 X |
| 3,175,433 | 3/1965 | Akers | 81—56 X |
| 3,195,655 | 7/1965 | Karden | 173—12 X |
| 3,320,835 | 5/1967 | Flory et al. | 81—54 |

ERNEST R. PURSER, Primary Examiner

U.S. Cl. X.R.

29—240; 81—52.4, 56; 91—59